United States Patent [19]

Perry

[11] 4,104,851
[45] Aug. 8, 1978

[54] MOWING MACHINE

[76] Inventor: James L. Perry, 4025 Hartland Rd., Gasport, N.Y. 14067

[21] Appl. No.: 711,552

[22] Filed: Aug. 4, 1976

[51] Int. Cl.² .................. A01D 75/18; A01D 55/18
[52] U.S. Cl. .................................. 56/10.4; 56/13.6
[58] Field of Search ............... 56/10.4, 10.2, 13.5, 56/13.6

[56] References Cited

U.S. PATENT DOCUMENTS 3,797,209  3/1974  Davis .................................. 56/13.6

Primary Examiner—Russell R. Kinsey
Attorney, Agent, or Firm—Christel & Bean

[57] ABSTRACT

A mowing machine of the offset rotary type wherein an assembly of rotary blades is carried by a frame movable along a surface bearing grass or foliage and including an additional rotary mower blade carried by a swinging arm at one end of the machine frame. The swing arm is held in a forward position by biasing springs, and it is moved to a rearward position to direct the additional blade around obstacles such as tree trunks and fence posts by retraction of an hydraulic cylinder, the rod end of which is coupled through a slack coupling to the swing arm. Operation of the hydraulic cylinder can be under manual control by the person driving the mowing machine, and it can be automatic in response to operation of a sensing element carried by the machine frame forwardly of the swing arm for detecting obstacles by contact.

16 Claims, 10 Drawing Figures

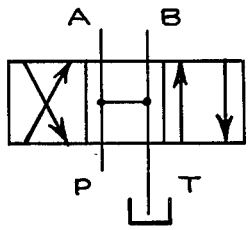
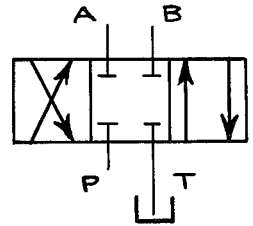
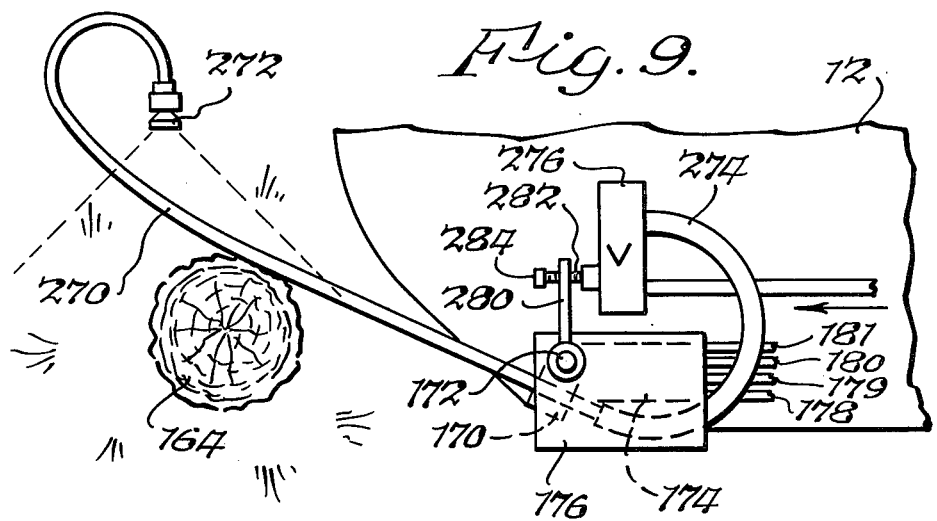
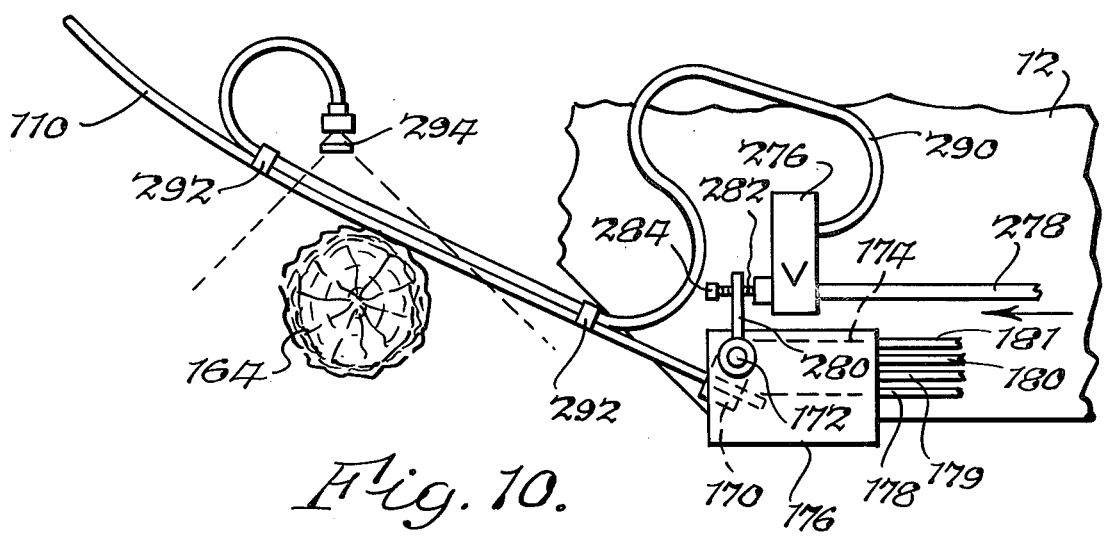

MOWING MACHINE

BACKGROUND OF THE INVENTION

This invention relates to the art of agricultural machinery, and more particularly to a new and improved mowing machine.

One area of use of the present invention is mowing grass and other foliage in orchards although the principles of the invention can be variously applied. When trees were planted in orchards with relatively larger spaces between trees as compared to present-day practice, mowing grass in the orchard was accomplished by a mower centered behind a tractor and travelling in a criss-cross pattern along the rows and perpendicular to the rows. With the present practice of closer planting, both in the row and between the row, it now is possible to mow only in a direction along the row.

As a result, mowing machines have been developed which are connected to the pulling tractor in an offset manner in an attempt to mow as close as possible to tree trunks, fence posts, and the like. Among the important factors to be considered in the design of such machines are the need to mow as close as possible to a tree trunk while at the same time preventing damage to the trunk by the mower blade, relatively high speed travel of the machine, capability of handling tree trunks, fence posts and the like of different sizes, locations and conditions, and efficient machine operation combined with simplicity of construction.

SUMMARY OF THE INVENTION

It is, therefore, an object of the present invention to provide a new and improved mowing machine.

It is a further object of the present invention to provide such a mowing machine capable of mowing close to tree trunks, fence posts and the like while preventing damage to the same by the mower blade.

It is a further object of the present invention to provide such a mowing machine which is movable at a relatively high rate of speed over the surface being mowed.

It is a further object of the present invention to provide such a mowing machine which is capable of mowing close to a wide variety of types and shapes of trees, posts and similar obstacles and under various conditions without damaging the same.

It is a further object of the present invention to provide such a mowing machine which is relatively simple in construction and efficient in operation.

The present invention provides a mowing machine comprising a frame movable along a surface bearing grass, foliage and the like, such as being drawn or pulled by a tractor, and mowing blade means carried by the frame. An additional mowing blade means is carried by arm means movably connected to the machine frame. The arm is biased to a forward or outward position, and is moved by controlled motive power means to a rearward or inward position to direct the additional mowing blade means around tree trunks, fence posts and similar obstacles. Operation of the motive power means can be under manual control by the person driving the mowing machine, and it can be automatic in response to operation of a sensing element carried by the machine frame forwardly of the arm for detecting obstacles by contact.

The foregoing and additional advantages and characterizing features of the present invention will become clearly apparent upon a reading of the ensuring detailed description together with the included drawing wherein:

BRIEF DESCRIPTION OF THE DRAWING FIGURES

FIG. 7 is a schematic diagram of a control valve for use in the hydraulic system for the mowing machine of the present invention;

FIG. 8 is a schematic diagram of another type of control valve;

FIG. 9 is a fragmentary top plan view of an alternative form of sensing element for the mowing machine of the present invention; and FIG. 10 is a fragmentary top plan view of an alternative form of sensing element for the mowing machine of the present invention.

DETAILED DESCRIPTION OF THE ILLUSTRATED EMBODIMENTS

Figure 1:
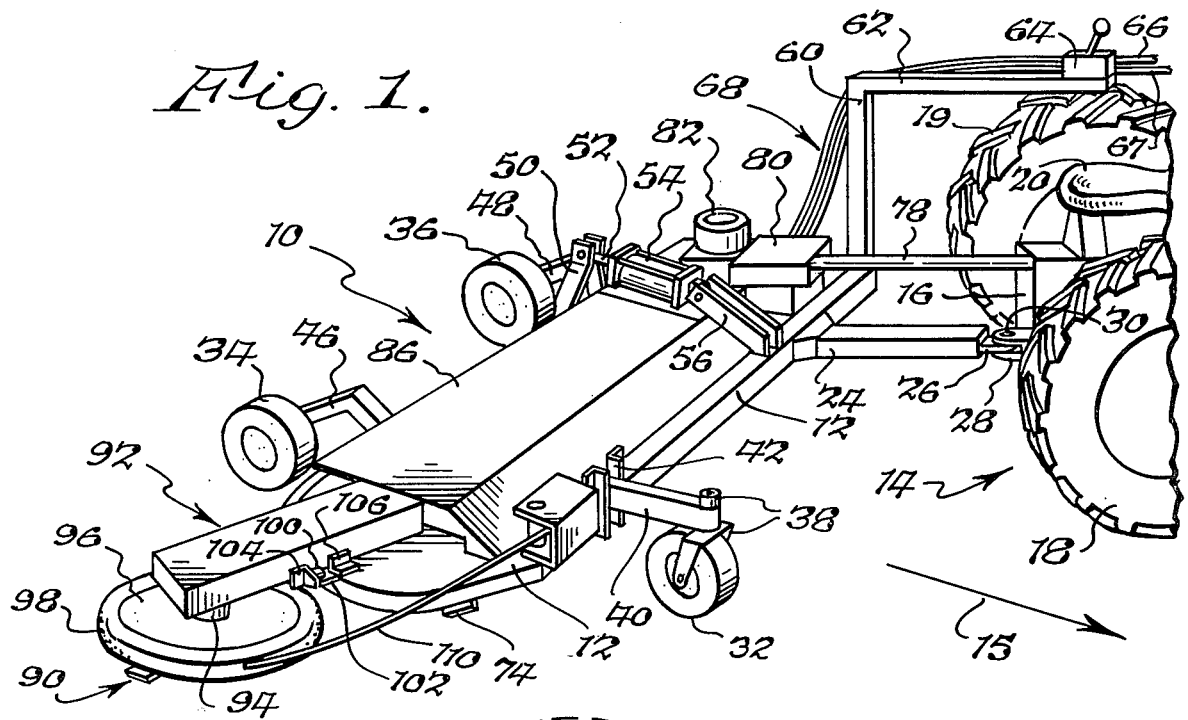
FIG. 1 is a perspective view of a mowing machine according to the present invention and showing a portion of a tractor for pulling the machine along a land surface to be mowed.

FIG. 1 is a perspective view of a mowing machine generally designated 10 according to the present invention and including a frame 12 movable along and over land surfaces bearing grass or similar foliage. In the present instance the machine 10 is drawn or pulled by a separate vehicle in the form of a conventional tractor generally designated 14. Alternatively, the principles of the present invention can be applied to a mowing machine which would include a suitable engine and drive means therein whereby it would be self-propelled. In either event, the direction of travel of machine 10 is in the general direction of arrow 15 in FIG. 1, which will be referred to as the forward direction. Briefly, tractor 14 includes a main chassis or housing 16, a pair of rear wheels 18, 19 and a seat 20 for the driver. The mowing machine 10 is generally rectangular in shape, and of low profile, and by way of illustration a large size machine would have an overall length of approximately 13 feet, and a width of approximately 3 feet and height of approximately 1½ feet. Machine 10 is connected to tractor 14 by means of a draw bar element 24 fixed at one end to frame 12 in a suitable manner and movably or pivotally connected at the other end to the rear of tractor 14 by a conventional hitch assembly including a plate-like connector element 26 extending from the outer end of draw bar 24 and fitted between the spaced horizontal legs of a hitch bracket 28 and a connecting pivot pin 30 extending therethrough. The draw bar 24 is connected to frame 12 at a location of the frame which is the forward side relative to the direction of travel of the machine. This location along the side is offset from the center of the machine, and the longitudinal axis of draw bar 24 is disposed at an angle with respect to the longitudinal axis of machine 10, both for a purpose to be described.

Machine 10 is supported on the surface over which it moves by means of a plurality of wheels, in the present instance the three wheels designated 32, 34, and 36 in FIG. 1. Wheel 32 is of the caster type and is to frame 12 adjacent the forward side, i.e. the same side to which draw bar 24 is connected, and at a location laterally offset from the center of the machine in an opposite direction relative to draw bar 24. The axle of wheel 32 is connected to the legs of a yoke element 38 which is pivotally connected at the upper end thereof above wheel 32 to one end of an arm 40, the other end of which is connected to a bracket 42 fixed to the side of frame 12. Arm 40 is disposed generally horizontally, yoke 38 is connected to arm 40 in a manner permitting swiveling movement of wheel 32 about a generally vertical axis, and the other end of arm 40 is selectively connectable to bracket 42 at spaced vertical locations by suitable means (not shown) thereby permitting adjustment of the height of frame 12 above the ground or supporting surface. The wheel 32 is spaced outwardly from frame 12 and is the front or forward wheel relative to the direction of travel of machine 10.

The rear wheels 34, 36 are rotatably mounted to an assembly which, in turn, is movably mounted on frame 12 in a manner permitting movement of the side of frame 12 adjacent wheels 34, 36, i.e. the rear side, in a generally vertical direction thereby permitting adjustment in the tilt or inclination of machine 10. In particular, wheels 34 and 36 are rotatably connected to angle arm elements 46 and 48, respectively, each angle arm having a first leg portion connected at the end thereof to the corresponding wheel axle and a second, relatively shorter leg portion extending therefrom, the two leg portions defining therebetween an angle greater than 90°. The shorter leg portions of the angle arms 46, 48 are fixed to corresponding ends of a rod or tube element (not shown) which is rotatably connected to frame 12, such as by suitable C-shaped brackets. A bracket 50 is fixed to the tube and extends above frame 12 where it is pivotally connected to the end of a rod 52 of an hydraulic cylinder 54 mounted in a suitable carrying frame or housing. The opposite end of cylinder 54 is pivotally connected to one end of a bracket 56, the other end of which is fixed to frame 12. Operation of cylinder 54 to extend or retract rod 52 pivots bracket 50 and rotates the tube (not shown) to raise or lower the wheels 34, 36 relative to frame 12.

Machine 10 further comprises an upstanding and forwardly extending arm including a generally vertical portion 60 fixed to frame 12 adjacent one end of the machine and a generally horizontal portion 62 extending from the upper end of portion 60 in a direction toward tractor 14 and terminating at a location near the tractor seat 20. A control valve 64 is fixed to the portion 62 whereby it is conveniently accessible for manual operation by the person driving tractor 14. A pair of hydraulic fluid lines 66, 67 are connected to valve 64 and to a pump and conventional source of hydraulic fluid (not shown) located on tractor 14. Additional hydraulic lines collectively designated 68 are connected to elements on machine 10. Two of the lines are connected to hydraulic cylinder 54 in a conventional manner for operating the same, and other lines are connected to additional parts of machine 10 for performing functions which will be described presently.

The mowing machine of the present invention further comprises mower blade means carried by frame 12 and operated to mow or cut grass or foliage beneath frame 12 as the machine moves along the ground. In the present instance, machine 10 is of the type including rotary mower blades disposed generally horizontally and mounted to the frame or to the supporting platform 12 for rotation about a generally vertical axis. A plurality of rotary blade elements, for example three, is provided in frame 12, and an end of one of such blade elements 74 is shown in FIG. 1. There also is provided drive means carried by frame 12 and operatively connected to the mowing blade means in the form of an arrangement of wheels and belts in frame 12 for rotating the blades and which will be described in detail presently. Power for operating the wheels and belts, in turn, is obtained from tractor 14 by means of a conventional power takeoff shaft 78 leading rearwardly from the chassis 16 and connected to one end of a drive coupling contained within housing 80, the other end of which is connected to a gear box assembly designated 82. The coupling within housing 80 permits a movable or pivotal connection between drive shaft 78 and the machine 10. The gear box assembly 82, in turn, is operatively connected to the drive mechanism including belts and wheels within machine 10. A cover 86 is fitted onto frame 12 in a manner enclosing the belts and wheels. The mower blades carried by frame 12 may be viewed as the main or primary mowing blade means of machine 10.

The mowing machine according to the present invention further comprises additional or auxiliary mowing blade means and means carrying the additional blade means from one end of frame or platform 12. In particular, the additional blade means in the present instance is a rotary type blade assembly similar to those included in frame 12 and is designated 90 in FIG. 1. Blade 90 is carried by support arm means movably connected adjacent one end to frame 12 and extending outwardly therefrom. In particular, the support arm means comprises a swinger arm element 92 which is pivotally connected at one end to frame 12, in a manner which will be described, and extends outwardly therefrom at an angle with respect to the longitudinal axis of frame 12. Blade 90 is rotatably mounted to the outer end of arm 92 and is carried beneath the arm. In particular, blade 90 is rotatably connected through a coupling 94 to arm 92, and a power transmission arrangement extends through the interior of arm 92 operatively connecting blade 90 to the main blade drive means in a manner which will be described in detail presently. A disc-shaped protector wheel 96 having an outer rim 98 of rubber or similar flexible material is rotatably connected to coupling 94 between blade 90 and the end of arm 92. The outer diameter of a circle defined by rotation of blade 90 is no greater than the diameter of wheel 96 and rim 98, and is preferably slightly less, whereby trees, posts and the like are protected from blade 90 in a manner which will be described. Arm 92 is supported for movement over frame or platform 12 by means of rollers, one of which is designated 100 in FIG. 1 engaging a horizontal track 102 on frame 12, the roller 100 being mounted to arm 92 by a bracket 104. The degree of pivotal or swinging movement of arm 92 is limited by stop elements provided on frame 12, one of which is designated 106 in FIG. 1.

In accordance with this invention, there is provided biasing means holding arm 92 in a first position and motive power means carried by frame 12 and operatively coupled to arm 92 for moving the arm to cause the additional blade means 90 to move around obstacles such as plants, trees, posts and the like. Preferred forms of biasing means and motive power means will be described in detail presently. There also is provided control means operatively connected to the motive power means for controlling operation of the same, and various forms of control means according to the present invention will be described in detail presently. Also in accordance with this invention, there is provided sensing means in the form of a detector or feeler element 110 carried by the machine 10 for detecting the presence of obstacles generally forwardly of blade 90 during movement of machine 10 over a surface. When the sensing means 110 detects an obstacle, this initiates operation of the motive power means carried by machine 10 for moving the arm 92 and blade 90 carried thereby in a direction to avoid the obstacle in a manner which now will be described.

Figure 2:
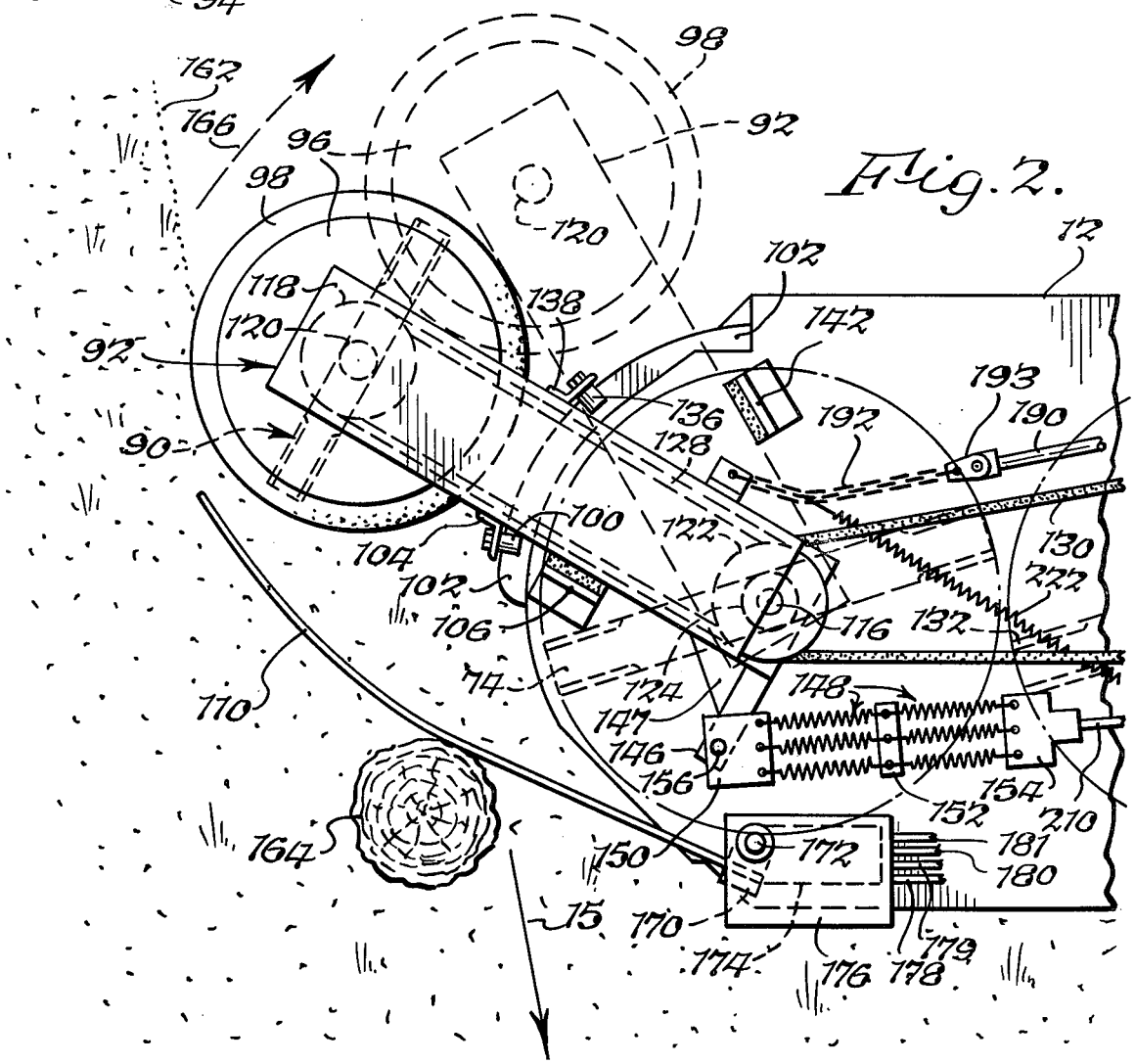
FIG. 2 is a fragmentary top plan view of the mowing machine of FIG. 1 showing the swing arm in the normal forward position.

Referring now to FIG. 2, the movable or swingable arm 92 is in the form of a hollow rectangular box closed at the outer end adjacent blade 90 and open at the inner end adjacent frame 12. Arm 92 is rotatably connected on the frame 12 by means of a shaft 116. A first wheel or sheave 118 provided with a single peripheral or circumferential groove is located at the outer end of arm 92 and is mounted on a spindle 120 which is fixed at one end to the center of blade 90 and extends into arm 92, suitable elements being provided to prevent vertical displacement of spindle 120. A second wheel or sheave 122 is located at the opposite end of arm 92 and is fixed to a spindle 124 which, in turn, is fixed at one end to blade 74 and extends through frame 12 and into the arm 92, suitable elements being provided to limit or prevent vertical displacement of spindle 124. Sheave 122 has two peripheral grooves, one of which receives a belt 128 which is trained at one end around sheave 122 and at the other end around sheave 118. A second belt 130 is trained at one end around sheave 122 along the second peripheral or circumferential groove and is trained at the other end around additional sheaves forming the drive for the additional main mower blades, one of which is designated 132 in FIG. 2. As a result, a common power drive is provided to all the mower blades of the machine including the main blades 74 and 132 shown in FIG. 2 and the additional blade 90 carried by arm 92.

As shown in FIG. 2, the supporting track 102 is generally arcuate or curved, extending along a portion of the curved end of frame or supporting base 12. Arm 92 is provided with another roller element 136 connected by a bracket 138 to the opposite side of the arm for engaging track 102. Stop element 106 comprises a right angle member one leg of which is fixed to the horizontal surface of frame 12 and the other leg of which extends vertically and is provided with a pad of cushioning material for engaging or contacting arm 92. A second stop element 142 identical to stop element 106 and similarly provided with a pad of cushioning material is fixed to frame 12 at a location spaced from stop 106 along an arcuate path, the length of which determines the extent of movement of arm 92.

Arm 92 is held in an initial or starting position engaging stop 106 as shown in FIG. 2 by biasing means in the form of a lever arm 146 fixed to the end of arm 92 adjacent the pivotal connection of arm 92 to frame 12. Lever arm 146 is disposed perpendicular to the longitudinal axis of arm 92, extends out from the side thereof facing stop 106, and is reinforced by a brace element 147 fixed to both arms 92 and 146. Lever arm 146 is pivotally connected at the outer end thereof to spring means generally designated 148. In particular, spring means 148 includes three spring mounting plates 150, 152 and 154, and mounting plate 150 is pivotally connected at point 156 to the outer end of lever arm 146. A plurality of springs, in the present instance three springs, are connected between the mounting plates 150, 152. Similarly, another plurality of springs, in the present instance three springs, are connected between mounting plates 152 and 154. Connecting plate 154, in turn, is connected to frame 12 and to other parts of the mechanism in frame 12 in a manner which will be described presently.

As shown in FIG. 2, machine 10 travelling in a forward direction indicated by arrow 15 has mowed the grass or other foliage generally rearwardly of the broken line 162. The machine has advanced to a location where the sensing means 110 contacts an obstacle in the form of a tree trunk 164, and additional forward movement of machine 10 will move feeler arm 110. This will cause movement of arm 92 and the blade 90 carried thereby about the pivot point 116 along a direction indicated by the broken arrow 166 to the broken line position of the elements indicated in FIG. 2. As a result blade 90 mows the area around tree trunk 164 as machine 10 moves forwardly in the direction of arrow 15. To accomplish this, the generally horizontal feeler arm 110 is fixed at the inner end thereof through a fitting 170 to a shaft 172 which is disposed generally vertically and mounted for limited pivotal movement. The feeler arm 110 is connected in controlling relation to an hydraulic control valve generally designated 174 contained within a housing 176 mounted on frame 12. Shaft 172 is mechanically connected to the valve spool or similar valve control element. Valve 174 is connected in an hydraulic circuit including the four lines designated 178, 179, 180 and 181, and by means of this circuit valve 174 is connected in controlling relation to motive power means for moving arm 92 in a manner which now will be described.

Figure 3:
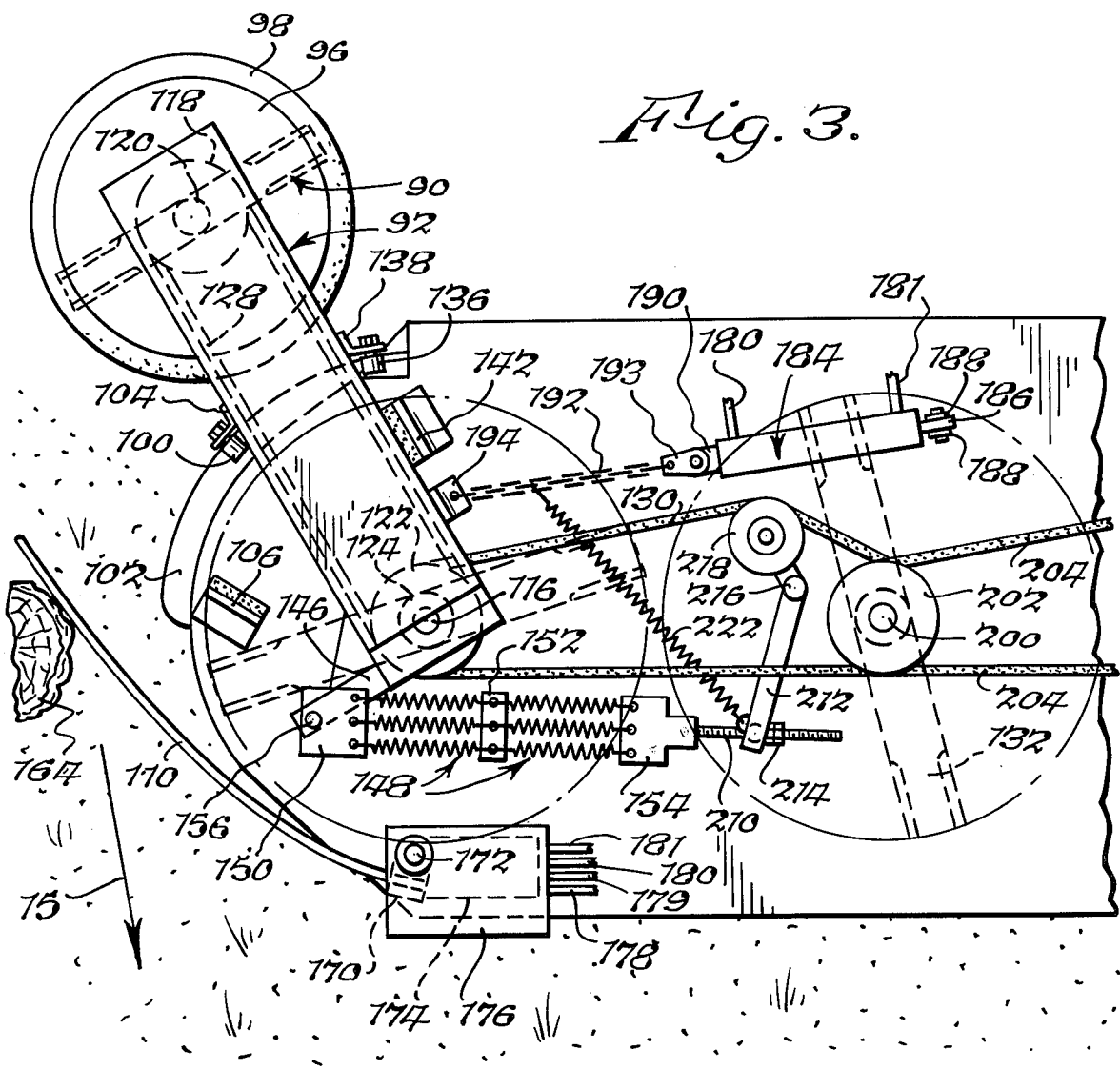
FIG. 3 is a fragmentary top plan view of the mowing machine of FIG. 1 showing the swing arm moved to a rearward position for movement around a tree or similar obstacle.

In the apparatus of the present invention, a preferred form of motive power means is an hydraulic cylinder designated 184 in FIG. 3 carried by frame 12 and operatively connected to arm 92. In particular, cylinder 184 is fixed at one end by means of a fitting 186 pivotally connected to a bracket 188 which, in turn, is fixed to frame 12. The cylinder 184 includes a movable piston rod 190 which is connected to arm 92 by a slack coupling in the form of a chain 192 connected at one end by an element 193 to rod 190 and at the other end to a bracket 194 fixed to the side of arm 92 facing the stop element 142. In the present instance bracket 194 is located on arm 92 approximately half the distance between the center of arm 92 and the end of the arm pivotally connected to frame 12. The slack coupling between the motive power means 184 and arm 92 through the chain 192 as compared to a direct, rigid coupling provides several advantages which will be described presently. Two of the hydraulic lines leading from valve 174, for example lines 180 and 181, are connected to cylinder 184 on opposite sides of the piston thereof in a known manner.

As shown in FIG. 3, blade 132 is fixed to a spindle 200 which extends vertically up through frame 12 and is connected to a wheel or sheave 202 provided with two circumferential grooves. The belt 130 is trained around one of these grooves, and another belt 204 is trained around the second groove, this belt being operatively connected to the remainder of the drive mechanism of the machine in a known manner. The apparatus as shown in FIG. 3 further comprises a tensioner assembly comprising a threaded rod 210 fixed at one end to plate 154 and extending parallel to the longitudinal axis of the springs and toward the opposite end of frame 12. A tensioner arm element 212 is freely, movably connected at one end on rod 210 and is held in position thereon by a nut assembly 214 threaded onto rod 210. Arm element 212 is defined by two legs intersecting at a point which is pivotally connected at 216 to frame 12. At the other end arm element 212 is pivotally connected to a tensioner wheel 218 having a peripheral groove engaging belt 130. A spring 222 is connected at one end to arm 212 near rod 210 and at the other end to chain 192 at about the mid point thereof for a purpose to be described.

The mowing machine 10 of the present invention operates in the following manner. It is drawn or pulled by tractor 14 along a land surface to be mowed, for example in an orchard between the rows of trees. The angular disposition of draw bar 24 causes machine 10 to be disposed at a slight angle to a line perpendicular to the row as it is pulled along the row by tractor 14. For example, the longitudinal axis of machine 10 preferably is disposed at an angle of approximately 10° with respect to a line perpendicular to a line parallel to the row of trees, i.e. the axis of the row. Furthermore, the offset location of draw bar 24 relative to machine 10 causes the end including arm 92 and blade 90 to be trailing or dragging, and the degree of offset determines the degree of trailing. The angular disposition of machine 10 results in overlap of the cutting paths of the adjacent, slightly spaced apart rotating blades in a known manner. The trailing of the end having arm 92 and blade 90 enables blade 90 to be moved relatively close to the bases of trees and posts in order to mow as closely as possible to them.

Thus, as machine 10 is pulled along a land surface, with arm 92 and blade 90 in the position shown in FIG. 2, a path of maximum width is cut or mowed in the grass or foliage. Normally, when machine 10 is moved along a path containing obstacles such as trees, posts and the like spaced along a row, a path of machine travel is started such that blade 90 is located slightly outwardly of the row of obstacles to permit effective mowing around each obstacle in a manner which now will be described.

When an obstacle is encountered, it first will be contacted by feeler arm 110 as shown in FIG. 2. As machine 10 continues to move forwardly, the obstacle such as tree trunk 164 pivots arm 110 about point 172. After a small degree of pivoting as determined mechanically, valve 174 is actuated to cause flow of hydraulic fluid to the rod end of cylinder 184 causing it to retract. Retraction of rod 190, in turn, tightens chain 192 and pulls arm 92 about pivot 116 to the position of FIG. 3. Movement of arm 92 is guided by rollers 100, 136 on arcuate track 102, and stop element 142 determines the location of arm 92 in this position. This occurs during further forward movement of machine 10 with the result that blade 90 is directed or carried in a manner mowing a path closely around the base of tree trunk 164. As machine 10 moves further along, arm 110 leaves contact with the tree trunk 164 and is returned to its original position. This can be aided by spring bias means (not shown). Valve 174 is returned to its original position, fluid leaves the rod end of cylinder 184, and the biasing means comprising lever arm 146 and spring means 148 returns arm 92 to the position of FIG. 2.

The foregoing operation results in blade 90 being moved or carried by arm 92 along a path closely around the base of tree 164 thereby providing effective mowing without damage to the tree. This operation is repeated as machine 10 moves further along in a forward direction encountering successive obstacles along the row. When the machine moves along the adjacent row, the remaining region around the base of each obstacle is mowed. The distance between blade 90 and tree 164 during mowing is determined by the speed of forward travel of machine 10 and by the location of feeler rod 110. Adjustment of the distance between rod 110 and the combination of arm 92 and blade 90 provides adjustment in the cutting area and determines the relationship between the speed of travel of the machine and the desired cutting area. The length of rod 110 can be adjusted to determine the holding time for arm 92 in the position of FIG. 3 and this in conjunction with the forward speed of machine 10 determines the amount of uncut grass area on the lead side of the tree. The height of rod 110 is selected to be above thick growth normally encountered in orchards and the like so that such growth does not erroneously activate rod 110. By way of illustration, rod 110 can be of cold rolled steel having a diameter of about ⅜ inch and a length of about 48 inches.

Hydraulic cylinder 184 operates relatively fast to move arm 92 and blade 90 to the position of FIG. 3, and the spring bias means return the arm and blade relatively quickly to the position of FIG. 2. As a result, machine 10 can move along an orchard or similar environment including a large number of obstacles at a relatively fast speed thereby enhancing efficiency of the mowing operation.

The harvesting machine 10 of the present invention is a retraction type system with the motive power means or hydraulic cylinder 184 operated as described above and also is a tension type system wherein chain 192 pulls arm 92 against the biasing force of spring means 148. Coupling hydraulic cylinder 184 through chain 192 to arm 92 advantageously provides the flexibility of operating machine 10 without hydraulic cylinder 184 should that be desired or necessary in the event of malfunction of cylinder 184. Machine 10 simply would be operated to move protector wheel 96 into engagement with the base of the tree or post, and continued forward movement of the machine moves arm 92 against the force of springs 148 to the position of FIG. 3, whereupon arm 92 is returned to the position of FIG. 2 after wheel 96 leaves contact with the obstacle. As a result, blade 90 mows grass closely around the base of the tree or post, the latter being protected by wheel 96 and the flexible outer rim 98.

Spring 222 can be used to adjust the degree of slack or flexibility in the coupling between cylinder 184 and arm 92 through chain 192, adjustment being provided by moving nut element 214 along threaded rod 214. The biasing force applied to arm 92 can be adjusted by changing the number of elements in spring means 148. Such adjustment can accommodate, for example, differences in types of plants, hill condition, and degree of slope.

Figure 4:
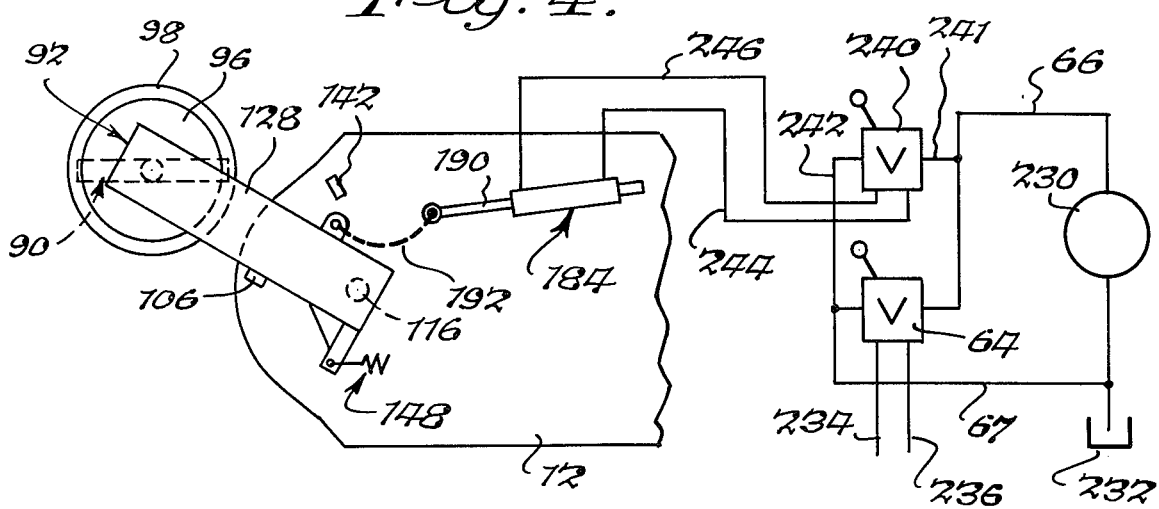
FIG. 4 is a schematic diagram of one form of an hydraulic control circuit and system for the moving machine of the present invention.

FIG. 4 is a schematic diagram of an hydraulic circuit and system providing manual control of the motive power means for operating arm 92 and the mower blade carried thereby. The tractor 14 shown in FIG. 1 is provided with a pump designated 230 in FIG. 4, with line 66 being the system supply line and line 67 being the system return line to a source of hydraulic fluid in the form of a tank 232. Lines 66 and 67 are connected to the supply and return ports, respectively, of manually-operated valve 64. In the present instance, the motor ports are connected by lines 234, 236 to the opposite sides of the piston in cylinder 54 shown in FIG. 1 for tilting the machine about a horizontal axis in a manner previously described. The system includes another manually-operated valve 240 having a supply port connected by a line 241 to system supply line 66 and a return port connected by a line 242 to the system return line 67. The motor ports of valve 240 are connected by lines 244, 246 to opposite sides of the piston movable within hydraulic cylinder 184. Valve 240 is located for convenient manual operation by the person driving tractor 14 and, for example, can be placed on arm 62 shown in FIG. 1 adjacent valve 64. Both valves 64 and 240 are of the type providing discrete on-off states of the fluid flow conditions.

In operation, when valve 240 is in the off state, arm 92 and blade 90 are in the position of FIG. 2 and when valve 240 is moved by the operator to the on position hydraulic fluid is conveyed through line 246 to the rod end of hydraulic cylinder 184. Rod 190 is retracted tightening chain 192 to pull arm 92 against the force of springs 148 whereby arm 92 and blade 90 are moved to the position of FIG. 3. The arm and blade will remain in this position as long as valve 240 is in the on position. As a result, the operator of the machine 10 has complete control over movement of blade 90 around obstacles during forward movement of the mowing machine. In other words, the control means is entirely manual in this form of the mowing machine, not automatic, such manual operation being desired by some users and being advantageous in certain mowing applications. When valve 240 is returned to the off position, fluid leaves the rod end of cylinder 184 through line 246 thereby allowing rod 190 to extend and the biasing force of springs 148 returns arm 92 and blade 90 to the position of FIG. 2.

Figure 5:
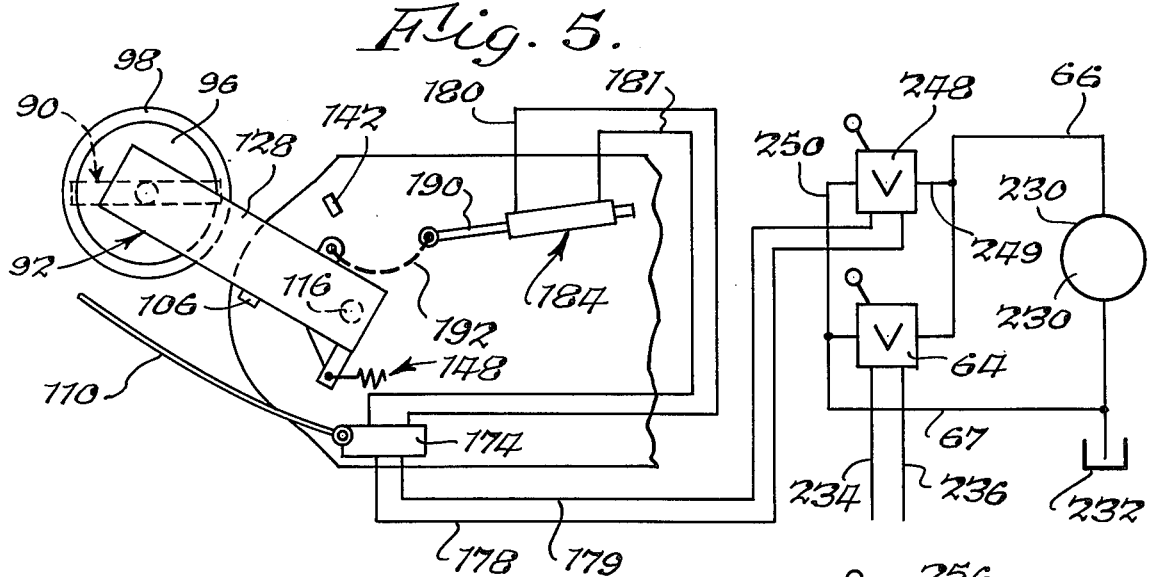
FIG. 5 is a schematic diagram of another form of an hydraulic control circuit and system for the mowing machine of the present invention.

FIG. 5 is a schematic diagram of an hydraulic circuit and system providing for automatic operation of the motive power means in response to operation of the sensing means to move arm 92 in the manner described above in connection with FIGS. 2 and 3. Components in the circuit and system of FIG. 5 which are identical to those in FIG. 4 are provided with the same reference numerals. Thus, in the circuit of FIG. 5 there is included a pump 230, tank 232, supply and return lines 66 and 67, respectively, manually operated valve 64 and lines 234, 236 connected to cylinder 54 on machine 10. A manually-operated valve 248 is provided, the supply port thereof being connected by a line 249 to supply line 66 and the return port thereof being connected by a line 250 to the system return line 67. Valve 248 simply functions as a master on-off control for the remainder of the system, and both valves 64 and 248 are of the discrete on-off type. The motor ports of valve 248 are connected by the lines 178, 179 to the supply and return ports of valves 174. The motor ports of valve 174 are connected by lines 180 and 181 to opposite sides of the piston within hydraulic cylinder 184 as described in conjunction with FIGS. 2 and 3.

The circuit and system of FIG. 5 operates in a manner similar to that described in conjunction with FIGS. 2 and 3. Thus, when feeler rod 110 contacts an obstacle and is pivoted through a relatively small arc during forward movement of the machine, valve 174 is operated to supply hydraulic fluid through line 180 to the rod end of hydraulic cylinder 184 causing rod 190 to retract, tightening chain 192, and moving arm 92 and blade 90 to the position of FIG. 3. When feeler rod 110 leaves contact with the obstacle, feeler rod 110 returns to its original position thereby returning valve 174 to a neutral position whereby fluid is allowed to leave the rod end of cylinder 184 through line 180 whereupon rod 190 is extended allowing spring means 148 to return arm 92 and blade 90 to the position of FIG. 2.

Valve 174 can be of the open center type having an open center flow passage provided by the spool land openings that connect the pump flow to the tank when the control valve spool is in its neutral position. For convenience in description, an open center valve is illustrated schematically in FIG. 7 wherein P and T represent lines connected to the system pump and tank, respectively, and wherein the motor parts are designated A and B. The hydrualic system of FIG. 5 is of the constant displacement variable pressure type, in terms of pump operation, with all parts open to each other and to the tank. As a result, hydraulic fluid flows through the center of valve 174 continuously, and fluid is directed or conveyed to a location for performing a function upon shifting of the spool of valve 174.

In accordance with this invention, it has been determined that by creating a resistance to fluid flow in the line leading from the open center valve 174 to the system tank, the system provides an automatic extension of rod 190 when the spool of valve 174 is returned to a neutral position. In particular, the flow resistance in one of the lines 178, 179 which leads to the system tank is increased such as by making this line relatively smaller in diameter or relatively larger in length, or by connecting an orifice element in this line. The resulting back pressure in this line gives rise to a pressure effect at the work ports of valve 174 when the spool is returned to a neutral position, because valve 174 is of the open center type wherein the pump and tank ports and both work ports all are in fluid communication when the valve spool is in a neutral position. The pressure effect created at the work ports of valve 174 is transmitted by lines 180, 181 to opposite sides of the piston in cylinder 184. The area differential within cylinder 184 on opposite sides of the piston gives rise to a net force causing rod 190 to be returned to an extended position.

Thus, when feeler arm 110 leaves contact with an obstacle such as a tree or post and returns the spool of valve 174 to the neutral position, the foregoing provides a fluid pressure-aided return of cylinder rod 190 to an extended position in cooperation with the force of springs 148 acting on arm 92 on return it to the position of FIG. 2. In other words, by virtue of the foregoing arrangement, advantageously the spring means 148 does not have to overcome any fluid force acting on cylinder 184 in order to return arm 92 to the position of FIG. 2. By way of further illustration, FIG. 8 is a schematic diagram of a valve of the closed center type, as contrasted with the open center valve 174 in the system of FIG. 5.

Figure 6:
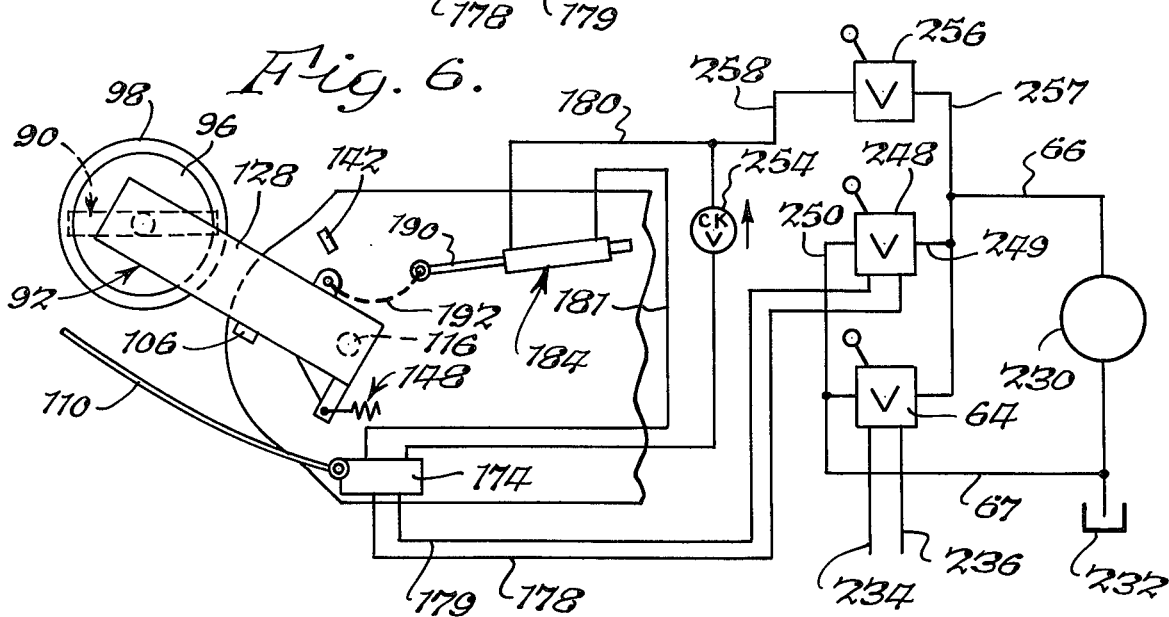
FIG. 6 is a schematic diagram of another form of an hydraulic control circuit and system for the mowing machine of the present invention.

FIG. 6 is a schematic diagram of an hydraulic circuit and system providing for both automatic operation and a manual override capability. Elements in the system of FIG. 6 identical to those in the systems of FIGS. 4 and 5 are provided with the same reference numerals. Thus there is provided pump 230, tank 232, the system pressure and return lines 66 and 67, respectively, manually-operated valve 64 connected through lines 234, 236 to cylinder 54, and the master on-off control valve 248. The manually-operated valve 248 is connected to the system supply and return by the lines 249 and 250, respectively, and also is connected to valve 174 through lines 178, 179. A check valve 254 is provided in line 180 for a purpose to be described. A manually-operated override valve 256 is provided in the system of FIG. 6 and is connected through a line 257 to the system supply line 66 and through a line 258 to line 180.

As in the system of FIG. 5, pump 230 can be of the constant displacement, variable pressure type, valve 174 can be of the open center type, and a flow resistance can be provided in the return line from valve 174 causing automatic extension of rod 190 when feeler arm 110 returns the spool of valves 174 to a neutral position. The automatic mode of operation of the system of FIG. 6 is identical to that of FIG. 5. Operation of valve 256 to the on position conveys hydraulic fluid through line 180 to the rod end of cylinder 184 thereby retracting the rod 190 and causing operation similar to that of the system of FIG. 4. This is of particular advantage, for example, when the machine operator sees an obstacle approaching which may not operate feeler arm 110 but where it is important to move arm 92 and blade 90 to the rearward position. Thus, the machine operator can override the automatic mode simply by manipulating valve 256 which would be located at a conveniently accessible position such as on arm 62. Check valve 254 prevents flow of fluid to the return port of valve 174 when valve 256 is opened.

FIG. 9 shows apparatus according to another embodiment of the present invention wherein the sensing element provides the additional function of conveying fluid to the tree or plant and ground region adjacent the same. For example, fluid in the form of tree or plant liquid nutrient or liquid weed control or other types of liquids can be conveyed. In the arrangement of FIG. 9, the sensing or feeler element is in the form of a hollow tube 270 which is provided at the outer end with a compound curve in the form of a return and downwardly extending bend whereupon the tube is connected at the end to a spray nozzle 272. The other end of tube 270 is fixed to line element 170 and pivotally connected at point 172 to valve 174 contained within the housing 176. This end of tube 270 is connected to one end of a flexible supply conduit 274, the other end of which is connected to the output port of a valve 276. The inlet port of valve 276 is connected to a supply conduit 178 leading from a supply of the fluid (not shown) which can be carried on machine 10. Control of the valve 276 is provided by movement of the tube 270 transmitted through a link 280 fixed to element 170 and connected to a valve control stem 282. Adjustment in the degree of pivotal movement of tube 270 about axis 172 to operate valve 276 can be controlled by an adjustment screw 284 in a conventional manner.

In operation, when tube 270 contacts the tree trunk 164, after a certain degree of pivotal movement about axis 172 as determined by the setting of adjustment screw 284, valve 276 opens thereby allowing flow of the liquid through tube 270 out from nozzle 272 to the region around the base of tree 164. Valve 276 can be provided with a metering arrangement or automatic shut-off, unless it is desired that valve 276 remain open as long as tube 270 is in contact with tree 164.

FIG. 10 illustrates an arrangement for providing the same function as that of FIG. 9 but where the feeler rod 110 is retained and a separate fluid conduit is carried thereby. In particular, the arrangement of FIG. 10 includes many of the elements included in that of FIG. 9 and, accordingly, identical reference numerals are applied thereto. The output of valve 276 is connected to one end of a tube or conduit 290 which extends along and is attached to the feeler arm 110 by brackets 292. The outer end of conduit 290 is provided with a compound curve similar to tube 270 including a return and downwardly extending bend whereupon it is connected to a conventional spray nozzle 294. The operation of the arrangement of FIG. 10 is similar to that of FIG. 9.

It is therefore apparent that the present invention accomplishes its intended objects. While several embodiments of the present invention have been described in detail, this is for the purpose of illustration, not limitation.

I claim:

1. In a mowing machine comprising a frame movable along a land surface, mowing blade means carried by said frame and drive means carried by said frame and operatively connected to said mowing blade means:
   a. support arm means movably connected adjacent one end to said frame and extending outwardly therefrom;
   b. additional blade means carried by said arm means and operatively connected to said blade drive means;
   biasing means holding said arm means in a first position;
   d. motive power means carried by said frame and operatively coupled to said arm means for moving said arm means to move said additional blade means around obstacles such as plants, trees, posts and the like; and
   e. control means operatively connected to said motive power means for controlling operation of said power means, said control means comprising sensing means for detecting said obstacles and causing operation of said motive power means in response thereto.

2. Apparatus according to claim 1, wherein said control means includes manually operated means for causing operation of said motive power means.

3. Apparatus according to claim 1, wherein said sensing means comprises:
   a. a detector element movably carried by said frame forwardly of said support arm means and adapted to be contacted by said obstacles and moved thereby; and
   b. means connected to said detector element and operatively connected to said motive power means for causing operation of said motive power means in response to movement of said detector element by an obstacle.

4. Apparatus according to claim 1, wherein said biasing means comprises spring means connected at one end to said frame and at the other end to said support arm means.

5. Apparatus according to claim 1, wherein said motive power means comprises an hydraulic cylinder operatively connected in an hydraulic circuit having a source of hydraulic fluid and wherein said control means comprises manually operated valve means connected in said circuit in controlling relation to said hydraulic cylinder.

6. Apparatus according to claim 5, wherein said hydraulic cylinder is moved from an extended position to a retracted position for moving said support arm means.

7. Apparatus according to claim 6, further including slack coupling means between said hydraulic cylinder and said support arm means.

8. In a moving machine comprising a frame movable along a land surface, mowing blade means carried by said frame and drive means carried by said frame and operatively connected to said mowing blade means:
   a. support arm means movably connected adjacent one end to said frame and extending outwardly therefrom;
   b. additional blade means carried by said arm means and operatively connected to said blade drive means;
   c. biasing means holding said arm means in a first position;
   d. motive power means carried by said frame and operatively coupled to said arm means for moving said arm means to move said additional blade means around obstacles such as plants, trees, posts and the like;
   e. control means operatively connected to said motive power means for controlling operation of said power means; and
   f. slack coupling means between said motive power means and said support arm means.

9. Apparatus according to claim 8, wherein said slack coupling means comprises flexible chain means.

10. Apparatus according to claim 8, further means operatively connected to said slack coupling means for adjusting the degree of slack in the coupling between said motive power means and said support arm means.

11. In a mowing machine comprising a frame movable along a land surface, mowing blade means carried by said frame and drive means carried by said frame and operatively connected to said mowing blade means;
   a. support arm means movably connected adjacent one end to said frame and extending outwardly therefrom;
   b. additional blade means carried by said arm means and operatively connected to said blade drive means;
   c. biasing means holding said arm means in a first position;
   d. motive power means carried by said frame and operatively coupled to said arm means for moving said arm means to move said additional blade means around obstacles such as plants, trees, posts and the like, said motive power means comprising an hydraulic cylinder operatively connected in an hydraulic circuit having a source of hydraulic fluid; and
   e. control means operatively connected to said motive power means for controlling operation of said power means, said control means comprising sensing means for detecting said obstacles and valve means controlled by said sensing means and connected in said circuit in controlling relation to said hydraulic cylinder.

12. Apparatus according to claim 11, wherein said sensing means comprises a detector element movable carried by said frame forwardly of said support arm means and adapted to be contacted and moved by said obstacles for operating said valve means.

13. Apparatus according to claim 11, wherein said hydraulic cylinder is moved from an extended position to a retracted position for moving said support arm means.

14. Apparatus according to claim 13, further including slack coupling means between said hydraulic cylinder and said support arm means.

15. Apparatus according to claim 12, wherein said hydraulic circuit includes a constant displacement variable pressure pump and said valve means is an open center valve having a spool operatively connected to said detector element, work ports connected to said hydraulic cylinder, a pressure port and a return and further including means creating a resistance to fluid flow in communication with said return port whereby when said valve spool is returned to a neutral position a pressure condition is created at said work ports thereby returning said hydraulic cylinder to its original position.

16. Apparatus according to claim 15, wherein said hydraulic cylinder is moved from an extended position to a retracted position for moving said support arm means.

* * * * *